United States Patent
van de Ven et al.

(10) Patent No.: US 7,970,940 B1
(45) Date of Patent: Jun. 28, 2011

(54) DOMAIN NAME SYSTEM LOOKUP LATENCY REDUCTION

(75) Inventors: Adriaan van de Ven, Portland, OR (US); Marcel Holtmann, Kirchlengern (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/655,020

(22) Filed: Dec. 22, 2009

(51) Int. Cl.
*G06F 15/16* (2006.01)

(52) U.S. Cl. ........................ 709/245; 709/219

(58) Field of Classification Search .............. 709/245, 709/219, 203
See application file for complete search history.

(56) References Cited

U.S. PATENT DOCUMENTS

| | | | | |
|---|---|---|---|---|
| 6,262,987 B1 * | 7/2001 | Mogul | | 370/400 |
| 7,254,642 B2 * | 8/2007 | Bhogal et al. | | 709/245 |
| 2002/0101836 A1 * | 8/2002 | Dorenbosch | | 370/329 |

OTHER PUBLICATIONS

Brain, Marshall. "How Domain Name Servers Work", Retrieved from http://www.howstuffworks.com/dns.htm/printable on Dec. 22, 2009; 5 pages.

* cited by examiner

*Primary Examiner* — Patrice L Winder
*Assistant Examiner* — Asghar Bilgrami
(74) *Attorney, Agent, or Firm* — Derek J. Reynolds

(57) ABSTRACT

A technique to reduce the latency of a remote DNS lookup operation is disclosed. More specifically, a machine-readable medium, method, device, and system are described that scan a document when it is retrieved from the Internet. The scan takes place for one or more patterns, where each pattern denotes an Internet host name. The technique then asynchronously causes an Internet Domain Name System (DNS) server to translate each Internet host name pattern discovered from the document scan to an associated Internet Protocol (IP) address. The technique then asynchronously stores each translated IP address in a local DNS cache.

25 Claims, 8 Drawing Sheets

DOMAIN NAME SYSTEM LOOKUP LATENCY REDUCTION

FIELD OF THE INVENTION

This invention relates to the process of performing a Domain Name System lookup over the Internet.

BACKGROUND OF THE INVENTION

When using the Internet on a cellular or similar mobile network, the translation, performed by remote Domain Name System (DNS) servers, from computer hostnames to Internet Protocol (IP) addresses can take a significant amount of time on the order of one to several seconds. This is due to the communication delays involved in cellular and many other mobile wireless technologies. Downloading and displaying a webpage in a web browser typically involves multiple such translations. For example, there may be a translation for the main page and often one translation for each of the images and advertisements on the main page. The delays introduced by these multiple translations slow down the display of a webpage and as a result degrade the mobile Internet experience.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a device and system to reduce domain name system lookup latencies are described.

A "DNS cache" and a "web proxy" work closely together. In many embodiments, the DNS cache and web proxy are utilized on a mobile computing device with access to the Internet. A web browser residing on the mobile computing device requests web pages. Based on these requests, the web proxy and DNS cache make requests with one or more remote domain name system (DNS) servers to retrieve translated Internet protocol (IP) addresses to use to contact one or more web content servers. Requests to translate Internet DNS host names are sent by the web proxy to the DNS cache that the web browser might need later. The translated IP addresses are then received back from the remote DNS server and stored in the DNS cache. Thus, when a request for a translation is made by the web browser through the web proxy in the future, the DNS cache may already have the translated IP address in its local storage and the latency normally associated with a host name translation request from a web browser to a remote DNS server may be reduced.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment. In the following description and claims, the terms "include" and "comprise," along with their derivatives, may be used, and are intended to be treated as synonyms for each other.

Throughout this disclosure the use of the term "logic" may mean circuitry in a computer system or, alternatively, it may mean any machine-readable construct, such as a group of electrical or electromagnetic signals that may be represented by "bits." The bits, when grouped together in a certain way, create software logic instructions, that may be performed by a machine, which causes the machine to perform various operations commensurate with the logic instructions. In one embodiment, for example, a logic instruction may be a computer-readable instruction, which when executed by a processor causes the processor to perform an operation or set of operations that are either indicated by the logic instruction or are otherwise consistent with the purpose of the instruction. Particularly, in one embodiment, an instruction may be a group of bits, or representation thereof, stored in some medium, such as diskette, semiconductor memory device, hard drive, compact disc, or the like.

Figure 1:
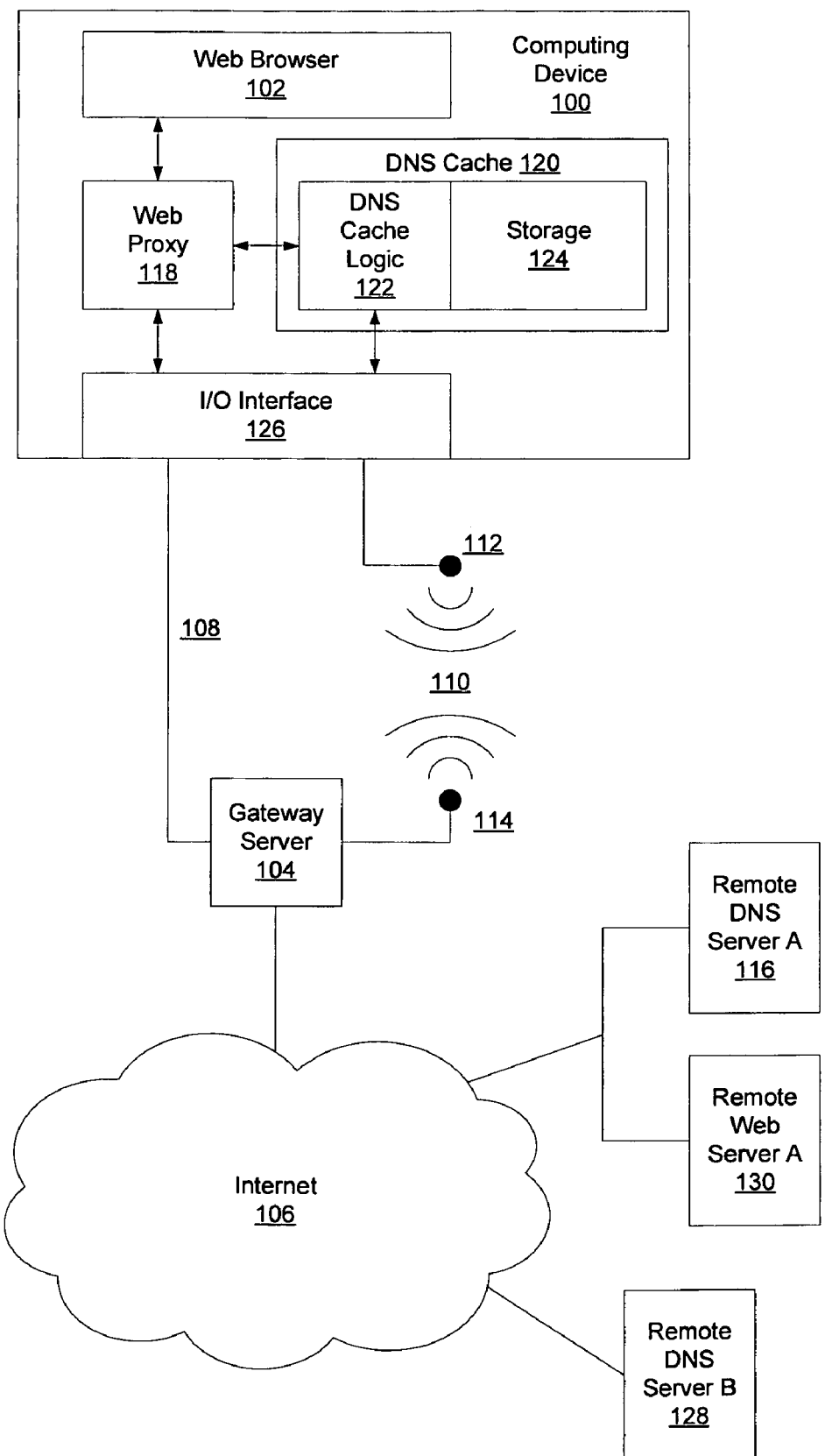
FIG. 1 illustrates an embodiment of a device and system to implement a DNS cache and web proxy.

FIG. 1 illustrates an embodiment of a device and system to implement a DNS cache and web proxy.

A computing device 100 includes components utilized to reduce DNS lookup latencies. The DNS lookup latencies associated with wireless networks may be significant. Sending a request to translate a host name to an IP address across a wireless network from a wireless computing device can take several seconds of delay before a response is returned. The translation is done generally at a remote server that receives the request and then sends the resulting IP address back to the wireless device. The delay many times is significant enough that a user of the wireless device may experience multi-second wait times for each request of a web page. Additionally, a given web page may contain content that is from yet other remote servers (e.g., advertisement images on the top or sides of the webpage). The full web page load time including all content can sometimes have latencies that become a burden to the user.

In many embodiments, the computing device 100 includes a web browser 102. This may be any usable web browser such as a Microsoft® browser, a Mozilla browser, or any one of many other usable browsers, including mobile-only browsers. The web browser 102 can access web content through user interaction. For example, a user may enter a URL (Uniform Resource Locator) address into the web browser and request that the browser fetch the web page (i.e., document) at the URL. The web page may include HTML (hypertext transport markup language) code as well as other types of code such as XML (extensible markup language), etc. Generally the web browser 102 would contact the web through a gateway server 104 or other server capable of coupling a localized network to the Internet 106 backbone. The localized network coupling the computing device 100 to the gateway server 104 may be a wired network 108 or a wireless network 110 in different embodiments. Furthermore, the connection that the computing device 100 has with the gateway server 104 may change depending on the state of the computing device 100. For example, at certain times the computing device may be utilized wirelessly when the user is active and moving. Yet, at other times the computing device may be plugged into a base station with a wired connection when the user is at home or in the office. In the wireless network 110 embodiment, the computing device 100 and the gateway server 104 are each communicatively coupled to some form of antenna (112 and 114, respectively) to allow for transmitting and receiving wireless communications.

Returning to the web browser 102 example described above, once the user has entered the URL (or clicked on a link in a web page), a translation request including a host name is sent across the Internet 106 and is received by a targeted remote DNS server, such as remote DNS server A 116 or remote DNS server B 128. The targeted remote DNS server receives the translation request with the host name to be translated, translates the host name into an IP address and returns the IP address to the web browser 102. The DNS is maintained by a distributed database system, which uses a client-server model. The nodes of this database are the name servers, such as DNS server A 116 and DNS server B 128. Each domain or sub-domain has one or more authoritative DNS servers that publish information about that domain and the name servers of any domains subordinate to it, including the IP address of the domain. The top of the hierarchy is served by the root name servers, which are the servers to query when looking up (resolving) a top-level domain name to get the corresponding IP address.

Alternatively to the general process described above, FIG. 1 includes specific additional logic within computing device 100 to reduce the perceived latency of the IP address lookup process between the web browser 102 and remote DNS server. Web proxy logic 118 receives all DNS lookup requests from the web browser 102. For each received request, the web proxy logic 118 provides a translated IP address retrieval service for the web browser 102. In many embodiments, the web proxy 118 works in tandem with a DNS cache 120. The DNS cache 120 comprises DNS cache logic 122 and storage 124. The storage may include a range of memory addresses that reference a volatile or non-volatile memory storage array. The DNS cache logic 122 may comprise control logic to directly interface with the storage 124 array. Additionally, the DNS cache logic 122 may be communicatively coupled to the web proxy 118 through an interface. The web proxy 118 sends host name translation requests from the web browser 102 to the DNS cache 120. The DNS cache 120 stores many recently requested translated IP addresses. If the requested translation of the host name into an IP address is not stored in the DNS cache 120, the DNS cache 120 will retrieve and store the translated IP address for quick access if the translation is requested again.

This retrieval and storage (also called lookup-and-store) may work asynchronously in conjunction with the web browser 102 requests. In other words, once the web proxy 118 notifies the DNS cache 120 of a translation request, the DNS cache 120 may work independently and as quickly as possible to retrieve the translation while the web browser 102 is retrieving web page content information through the web proxy 118 from a remote web server, such as remote web server A 130 (which is a content server associated with remote DNS server A 116). Generally web browsers interpret HTML and other languages serially, thus loading a full web page can take significant time if there are multiple remote DNS host names in the document. The specific process the web proxy 118 and the DNS cache 120 utilize to reduce DNS lookup latencies is described in detail below in relation to the description of FIGS. 2A-2C.

Computing device 100 also may include an I/O (input/output) interface 126. The I/O interface 126 may communicatively couple the computing device 100 to other computers, networks, and the Internet 106 through wired interface 108 and/or wireless interface 112.

In many embodiments, the asynchronous nature of the retrieval of the translation(s) allows the DNS cache 120 to retrieve a requested host name translation while not causing a dependency that the web browser 102 necessarily would need to wait for. In many embodiments, the web proxy logic 118 may scan the web page being retrieved by the web browser 102 for patterns denoting Internet host names. The web proxy logic 118 may request the DNS cache 120 look up any pattern that may be able to be interpreted as a valid host name (e.g., "http://www.google.com/intl/en_ALL/images/"). The set of valid host names from the entire web page (or other form of web document being retrieved) can then be immediately sent in parallel to the DNS cache 120.

The DNS cache 120 may have some or all of the IP address translations stored. For each translation that the cache is not currently storing, the DNS cache 120 sends a translation request to the specific remote DNS server that provides IP address translations for the host name domain in question. The DNS cache 120 then receives these translated IP addresses from the DNS server(s) and stores them. In many embodiments, because these particular host names have not yet been requested by the web browser itself and instead are being requested by the web proxy specifically to prime the DNS cache 120, the translated IP addresses that are already in the cache as well as those that the cache has to proactively retrieve will not necessarily be immediately sent back to the web proxy logic 118. Once the web browser 102 specifically requests the web proxy for a given translation of one of the host names, then the web proxy logic 118 requests the same translation from the DNS cache 120. The DNS cache 120 then immediately returns the translated IP address associated with the requested host name translation to the web proxy logic 118, which then in turn returns the translation to the web browser 102.

In other embodiments, the web browser 102 specifically requests the web proxy logic 118 to retrieve the content of the web page. In these embodiments, the web proxy logic 118 retrieves the translated IP address from the DNS cache 120 and then, using the translated IP address, requests the content from an Internet web server at the translated IP address. Once the web proxy logic 118 has retrieved the content, it can send the content to the web browser 102. Thus, in different embodiments, the web browser 102 can request the translated IP address and perform the content retrieval or the web browser 102 can request the content at the translated IP address and have the web proxy logic 118 perform the content retrieval.

In some embodiments, the web browser 102 is aware of the web proxy 118 and communicates directly with the web proxy 118. In other embodiments, the web browser 102 is not aware of the web proxy 118 and the web proxy 118 actually intercepts requests from the web browser 102 and returns the results to the web browser 102 when the requests have been completed.

Figure 2A:
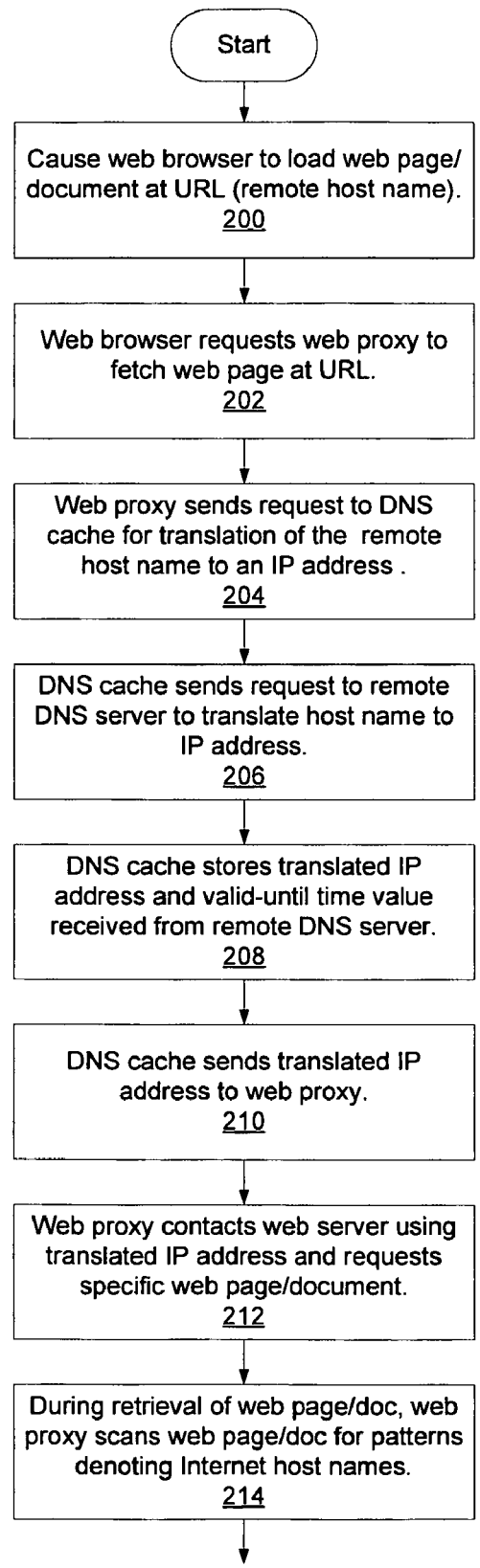
FIGS. 2A-2C illustrate a flow diagram of an embodiment of a process to reduce DNS lookup latency utilizing the above described logic located in a computing device.
Figure 2B:
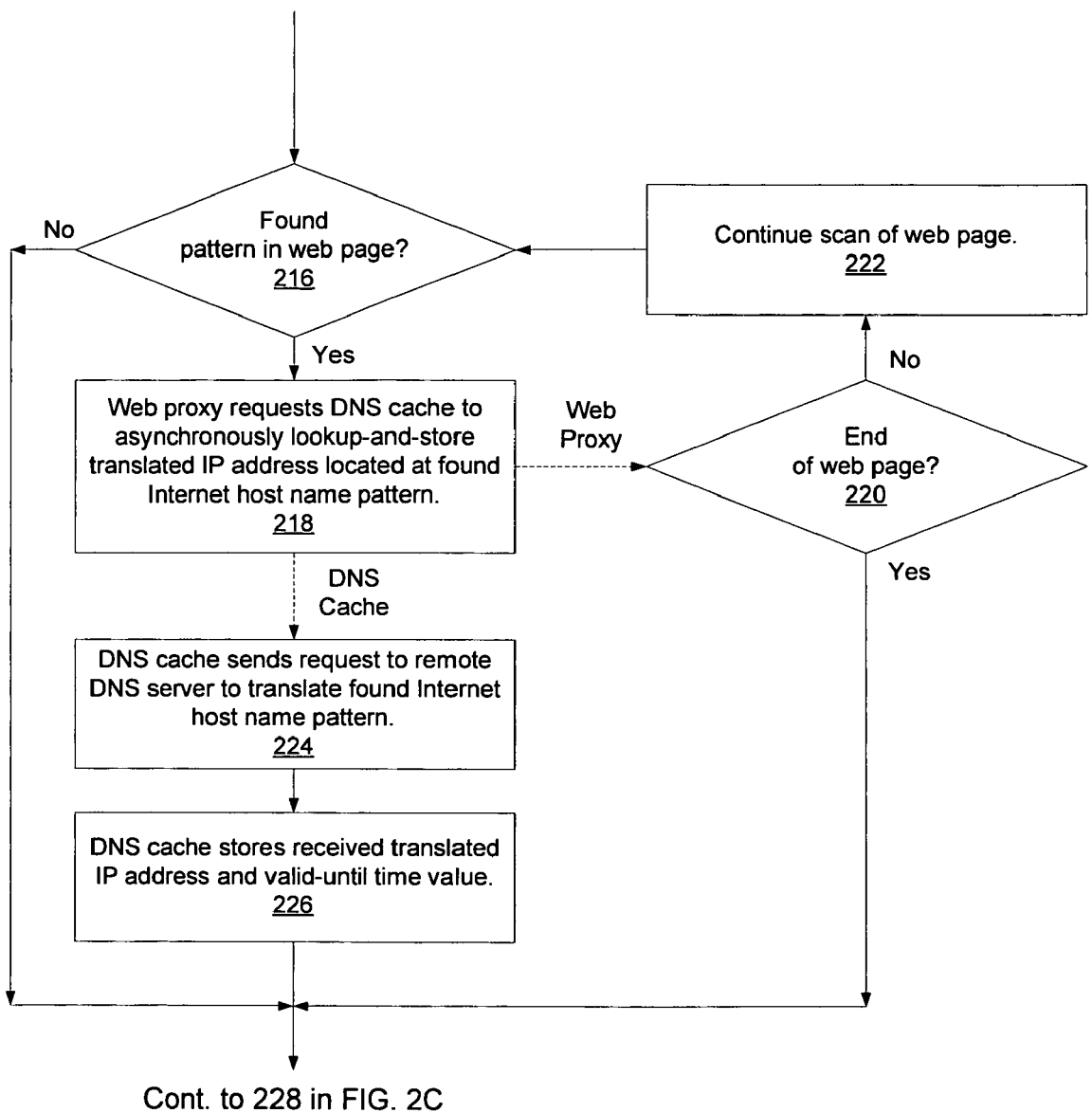
Figure 2C:
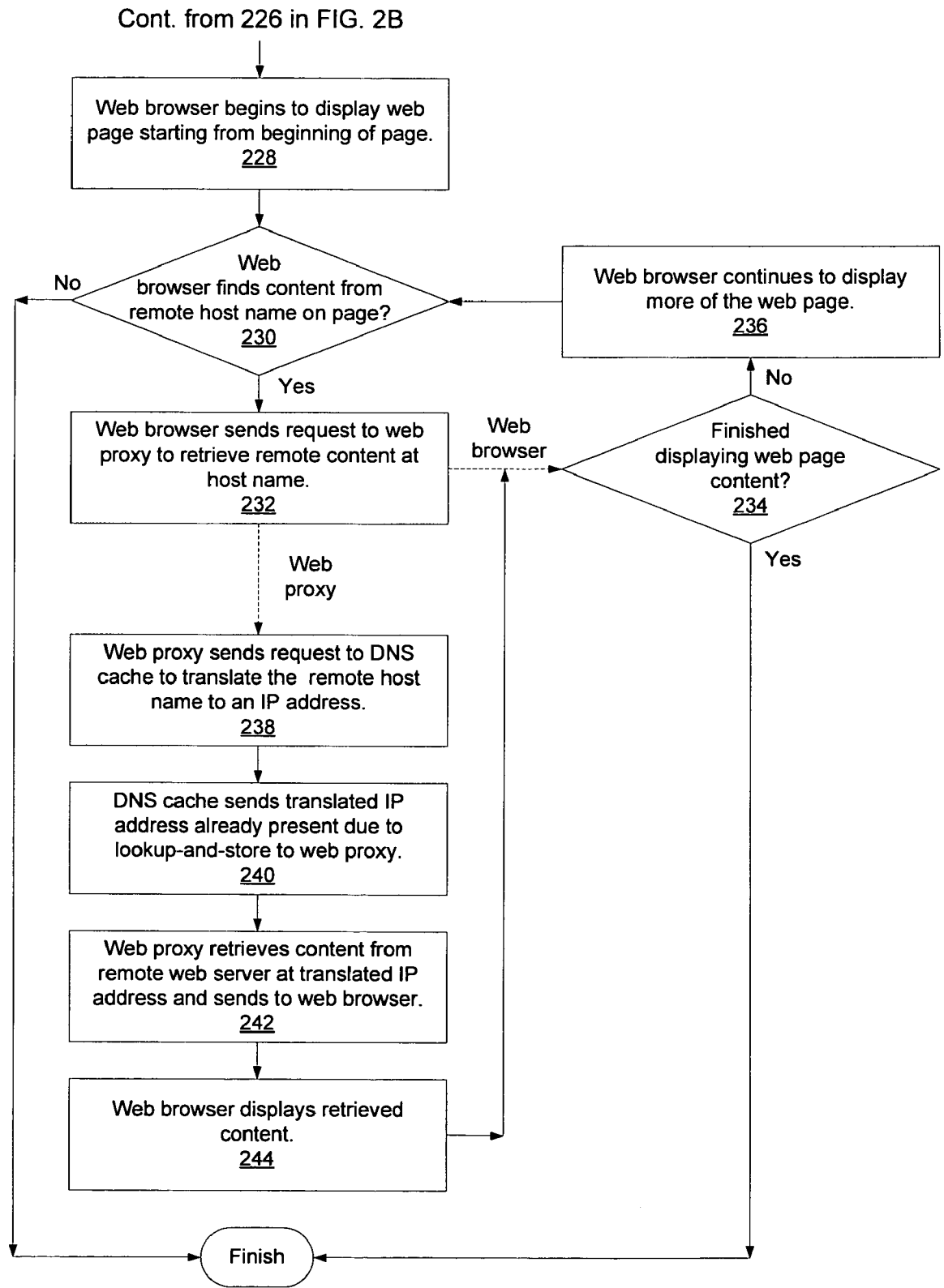

Turning now to FIGS. 2A-2C, these figures illustrate a flow diagram of an embodiment of a process to reduce DNS lookup latency utilizing the above described logic located in computing device 100. The process can be performed by processing logic that may comprise software (e.g., an application running on top of an operating system), hardware (e.g., circuitry in a computer system), firmware (e.g., microcode), or any combination of the three forms of logic listed.

The process begins in FIG. 2A by processing logic causing the web browser to load a web page (or other web document) at a URL (processing block 200). The URL comprises a remote host name. The host name could be any form of a recognized link to an Internet domain. For example, "http://www.yahoo.com" is a link including a host name that may be typed into the address bar of web browser 102. Processing logic within the web browser 102 may cause the browser to load the web page by receiving a user's input such as the clicking of the link or the typing of the link into the address bar of the browser (and pressing enter). Actions such as these would be recognized by the web browser 102 logic to begin a process of loading the sought after web page.

The process continues with processing logic in the web browser 102 requesting web proxy logic to fetch the web page at the URL (processing block 202). The web page at the URL may comprise HTML-based code and/or additional markup languages such as XML. Processing logic in the web proxy then sends the request to the DNS cache for translation of the remote host name to an IP address (processing block 204). Processing logic in the DNS cache receives the request, and assuming this is the first time this web page has been requested, then sends the request to a remote DNS server to translate the host name to an IP address (processing block 206).

Next, processing logic receives the translated IP address from the remote DNS server and stores the address in the cache storage (processing block 208). Additionally, the DNS cache also receives a value from the remote DNS server that corresponds to how long the translated IP address is valid (valid-until time value). In many embodiments, the valid-until time value is referred to as a "time to live (TTL)" value. The translated IP address will become invalid after the valid-until time has expired. At that point, another request would need to be sent to the remote DNS server to retrieve a new translated IP address. Processing logic within the DNS cache may store the valid-until time with the translated IP address in the cache storage array. Then the DNS cache sends the translated IP address to the web proxy logic (processing block 210). The web proxy then utilizes the translated IP address to contact the remote web server that hosts the content to retrieve the specific web page associated with the translated IP address (processing block 212). The web server stores the web page markup language code (e.g., HTML) itself as well as potentially some content associated with the web page (e.g., images), but not necessarily all content. Other content, such as content related to advertisements, may be stored on other web servers that are remote from the web server that stores the web page.

As the web page is downloaded from the web server, processing logic in the web proxy begins scanning the web page for patterns that denote Internet host names (processing block 214). As discussed above, these patterns need to resolve into a fully functional host name so that the DNS server for that host name's domain can be reached.

Turning to FIG. 2B, processing logic checks to see if a host name pattern has been found in the web page/document (processing block 216). If a pattern has been found, then processing logic in the web proxy sends a request to the DNS cache to asynchronously lookup-and-store a translated IP address associated with the found Internet host name pattern (processing block 218). At this point processing logic branches into two separate paths. Processing logic in the web proxy determines if the document has ended (processing block 220).

If the document has ended, then processing logic in the web proxy continues on to FIG. 2C. If the document has not ended, the processing logic in the web proxy continues the scan of the document (processing block 222). Processing logic in the web proxy then returns to block 216.

Processing logic in the DNS cache, on the other hand, sends a request to a remote DNS server to translate the found Internet host name pattern received from the web proxy (processing block 224). Then processing logic in the DNS cache stores the received translated IP address and valid-until time value in its storage array (processing block 226). Processing logic in the DNS cache performs processing blocks 224 and 226 for each host name pattern found by the web proxy. Thus, the web proxy may cause the DNS cache to perform blocks 224 and 226 multiple times.

Turning to FIG. 2C, processing logic in the web browser begins to display the web page starting at the beginning of the page (processing block 228). The web browser interprets the markup language present in the web page in a linear fashion, (i.e., from the top to the bottom of the page). As the web browser works down the page, processing logic determines if there is content on the page from a remote host name on the page (processing block 230), such as an image. If processing logic in the web browser determines that there is no remote content from a remote host name on the page, then the process is finished because the web browser was successfully able to complete the process of displaying the web page. On the other hand, if the web browser does encounter remote content on the web page, then processing logic in the web browser sends a request to the web proxy logic to retrieve the remote content at the host name (processing block 232). (i.e., like reading a page in a book).

At this point, processing logic branches into two separate paths, processing logic in the web browser and processing logic in the web proxy, where both can continue processing in parallel. Processing logic in the web browser determines if it has finished displaying the web page content (processing block 234). If the web page is completely displayed, then processing logic in the web browser is finished for the time being. Otherwise, if the web page is not completely displayed, then the web browser continues to display more of the web page (processing block 236). At this point web browser processing logic returns to block 230.

Returning to the branch, processing logic in the web proxy then sends a request to the DNS cache to translate the remote host name to an IP address (processing block 238). In many embodiments, the sought translated IP address is already in the DNS cache storage due to blocks 218, 224, and 226 of the process in FIG. 2B. In these embodiments, processing logic in the DNS cache then immediately sends the translated IP address to the requesting web proxy logic (processing block 240). The web proxy logic then utilizes the translated IP address to contact a remote web server storing the content referenced on the web page and retrieves that content and sends the retrieved content to the web browser (processing block 242). The web browser displays the retrieved content on the displayed web page (processing block 244).

After the web browser has displayed the retrieved content, processing logic in the web browser returns to block 234 to check if the web page has finished displaying the web page. If so, the process is finished, but otherwise, the process continues back through block 236 and on.

Figure 3:
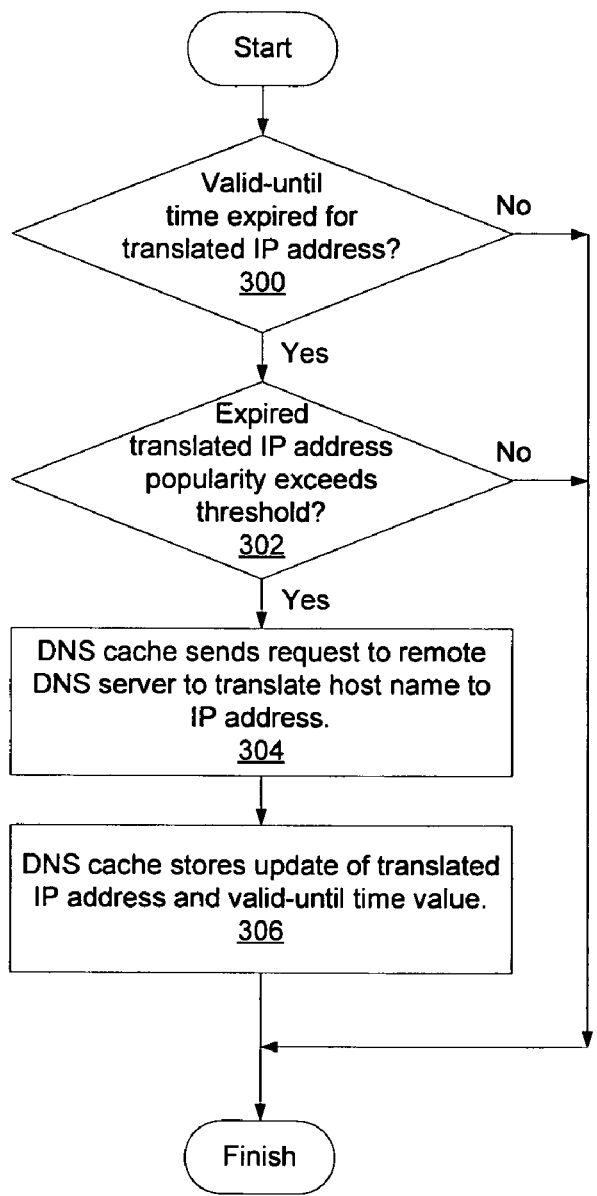
FIG. 3 is a flow diagram of an embodiment of a process to proactively re-translate IP addresses that have expired in time.

FIG. 3 is a flow diagram of an embodiment of a process to proactively re-translate IP addresses that have expired in time. Again, the process can be performed by processing logic that may comprise software (e.g., an application running on top of an operating system), hardware (e.g., circuitry in a computer system), firmware (e.g., microcode), or any combination of the three forms of logic listed.

Turning now to FIG. 3, the process begins by processing logic in the DNS cache determining whether a given valid-until time has expired for a translated IP address (processing block 300). In some embodiments, there may be a queue of valid-until times sorted in the order that they expire, thus the DNS cache processing logic can set an expiry timer equal to the time of the shortest valid-until time and the logic may then be informed to process the front of the queue once the timer has expired. Then once the front of the queue has been serviced, the timer is reset to the next shortest valid-until time. Many other implementations of determining when valid-until times expire are possible, this particular implementation is just an example.

If no valid-until time has expired, then the process is finished because all translated IP addresses are still currently valid. On the other hand, if a valid-until time has expired, then processing logic determines whether the expired translated IP address has a popularity level that exceeds a threshold popularity level (processing block 302). The popularity level of a given translated IP address may be calculated based on any one or more of many possible metrics. For example, the pure number of times the particular IP address has been accessed during the current browser session may be a metric that can have a threshold value number of times to compare against. Another example may be the pure number of times the particular IP address has been accessed through a multiple number of browser sessions may be the metric. The multiple number of browser sessions may be the entire lifetime of browser sessions for the computing device or may be the number of browser sessions within a most recent time period (e.g., the past month). An additional example of a popularity metric may be to compare the number of accesses to an entire top level domain host name, rather than to a specific web page within the domain, against the threshold value. Many other examples of determining a popularity metric may be implemented.

Returning to FIG. 3, if the popularity does not exceed the threshold, then the process is finished. Otherwise, if the popularity does exceed the threshold, then processing logic in the DNS cache sends a request to a remote DNS server to re-translate the host name corresponding to the expired IP address (processing block 304). Next, the DNS cache stores the update of the translated IP address and new valid-until time value into the storage array (processing block 306) and the process is finished.

In many embodiments, the popularity metric may also be used to determine a number of cached translated IP addresses to be stored in a non-volatile storage space through a reboot, a low power state, or a power cycle of the computing device 100. In other words, when the computing device 100 is not fully operational, some or many of translated IP addresses that are considered popular may be stored through the power cycle along with the valid-until times. Upon a restart of the computing device, the DNS cache can then go through all saved translated IP addresses in the storage array and send requests to re-translate any with expired valid-until times. This allows popular translated IP addresses to be locally available for future use through times when the computing device is not operational.

There are many other ways to implement the device and system illustrated in FIG. 1. For example, FIG. 4 illustrates another embodiment of a device and system to implement a DNS cache and web proxy.

Figure 4:
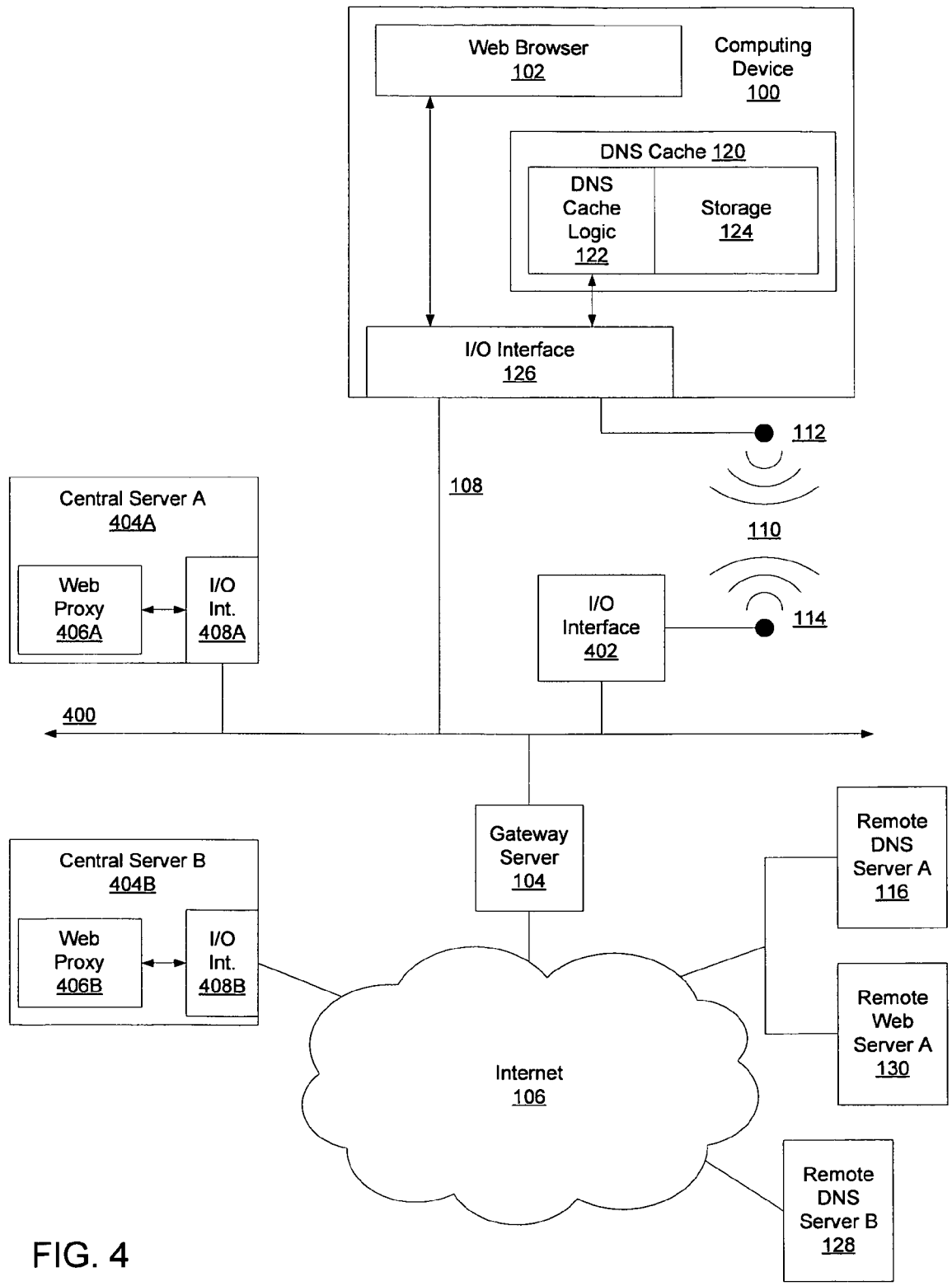
FIG. 4 illustrates another embodiment of a device and system to implement a DNS cache and web proxy.

In FIG. 4, the computing device 100 includes the web browser 102, DNS cache 120, and I/O interface 126, but the web proxy logic may be located elsewhere. For example, the web proxy may be located in a central server. The central server may be located on a local network 400 (i.e., central server A 404A), this may be referred to as a local network because the central server is communicatively coupled to the same network 400 that the computing device 100 is coupled to as well. Specifically, central server A 404A communicates with other servers and devices on the Internet through gateway server 104 similarly to computing device 100. Furthermore, computing device 100 and central server 404A may be deemed relatively "local" to each other because they can communicate with each other without requiring a communication link through the Internet 106.

Alternatively, the central server in FIG. 4 containing the web proxy may be remotely accessed by the computing device 100 through the Internet 106 (i.e., central server B 404B). Again, in FIG. 4, computing device 100 may be communicatively coupled to local network 400 either through a wired connection 108 or a wireless connection 110. In the wireless connection embodiment, a send and receive transmission antenna 114 is required to be coupled to the local network 400, potentially through an I/O interface 402. The main components in FIG. 4, including web browser, DNS cache, and web proxy, all provide the same functionality as discussed in detail above in reference to FIG. 2A, 2B, 2C, and FIG. 3.

Figure 5:
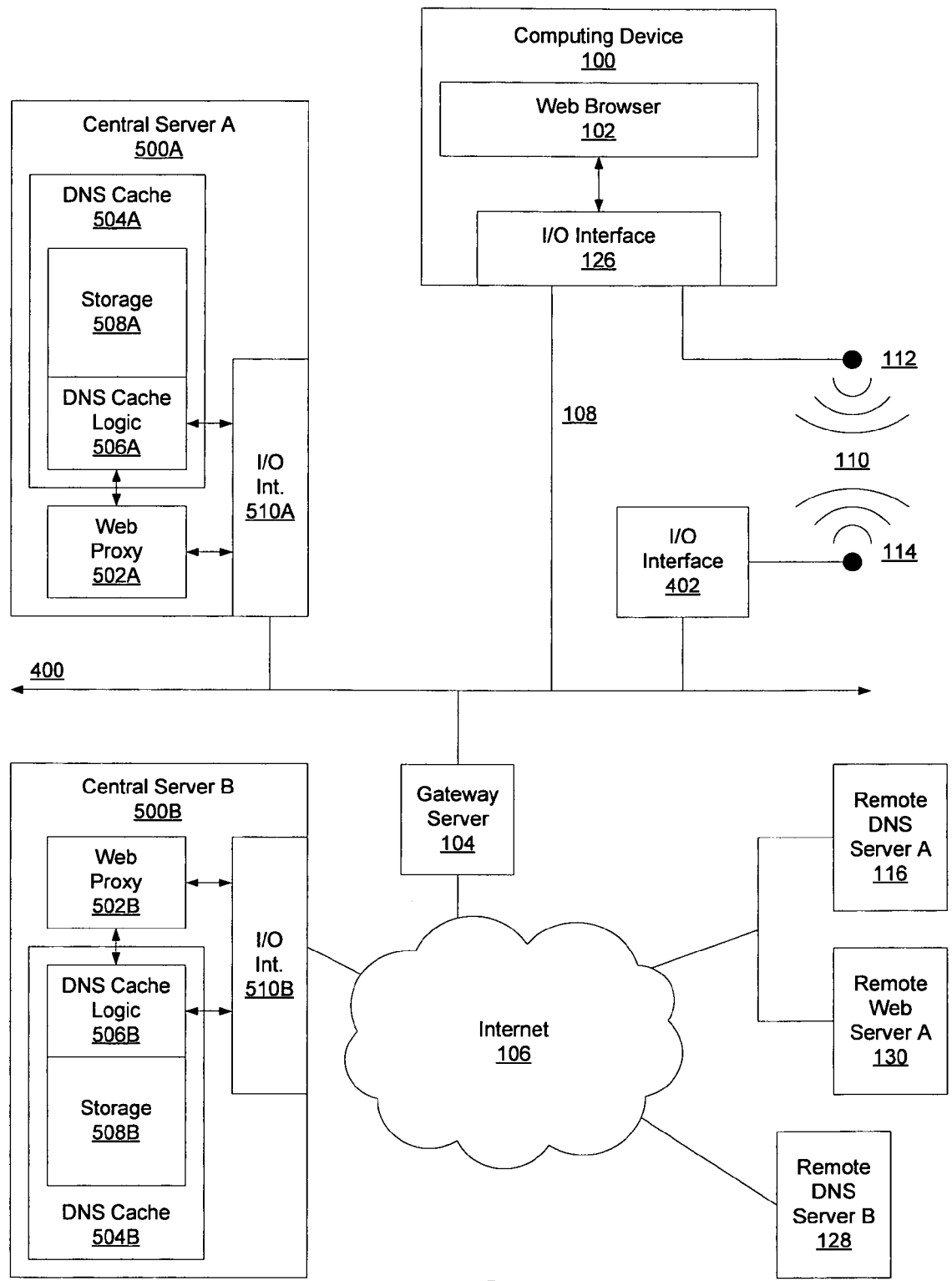
FIG. 5 illustrates yet another embodiment of a device and system to implement a DNS cache and web proxy.

FIG. 5 illustrates yet another embodiment of a device and system to implement a DNS cache and web proxy.

In FIG. 5, the computing device 100 includes the web browser 102 and I/O interface 126, but the web proxy logic and DNS cache may be located elsewhere. For example, the web proxy may be located in a central server. The central server may be communicatively coupled to local network 400 (i.e., central server A 500A) or to the Internet 106 (i.e., central server B 500B) in different embodiments. These embodiments as far as the locations of the central server are discussed above in reference to FIG. 4. Although, in FIG. 5, the DNS cache is also located on the central server. In different embodiments, DNS cache 504A is maintained in central server A 500A or DNS cache 504B is maintained in central server B 500B. Again, just as in FIG. 4, the main components in FIG. 5, including web browser, DNS cache, and web proxy, all provide the same functionality as discussed in detail above in reference to FIG. 2A, 2B, 2C, and FIG. 3.

Figure 6:
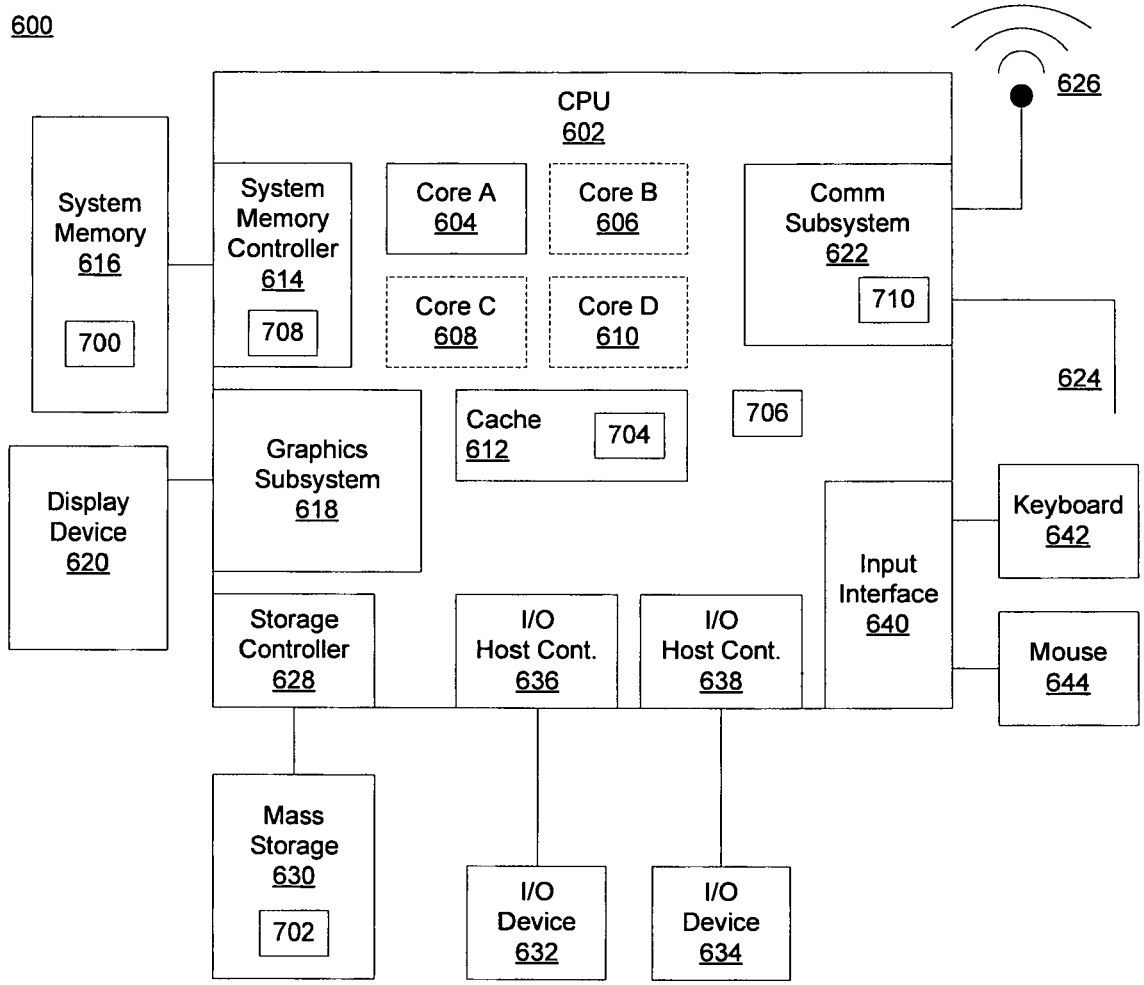
FIG. 6 illustrates an embodiment of a computer system that includes web proxy and DNS cache logic for reducing host name lookup latency for a mobile Internet connection.

FIG. 6 illustrates an embodiment of a computer system that includes web proxy and DNS cache logic for reducing host name lookup latency for a mobile Internet connection.

Computer system 600 is shown. The computer system in FIG. 6 generally comprises a system on a chip (SoC) layout. The SoC layout may be utilized in any type of computer system but is useful for small form factor computing devices, such as cellular phones, smart phones, and small laptop computers, such as netbook-type computing devices.

The computer system 600 includes a central processing unit (CPU) 602. In a SoC layout, it is common to have a single CPU, though in other embodiments that are not shown, one or more additional CPUs are also located in computer system 600.

CPU 602 may be Intel® Corporation CPU or CPU of another brand. CPU 602 includes one or more cores. In the embodiment shown, CPU 602 includes Core A (604), Core B (606), Core C (608), and Core D (610). Only one core is needed for operation of the computer system, but additional cores can distribute workloads and potentially increase overall system performance. In many embodiments, each core (such as core A (604)) includes internal functional blocks such as one or more execution units, retirement units, a set of general purpose and specific registers, etc. If the cores shown in FIG. 6 are multi-threaded or hyper-threaded, then each hardware thread may be considered as a core as well.

CPU 602 may also include one or more caches, such as last level cache (LLC) 612. In many embodiments that are not shown, additional caches other than cache 612 are implemented where multiple levels of cache exist between the execution units in each core and memory. In different embodiments cache 612 may be apportioned in different ways. Cache 612 may be one of many different sizes in different embodiments. For example, cache 612 may be an 8 megabyte (MB) cache, a 16 MB cache, etc. Additionally, in different embodiments the cache may be a direct mapped cache, a fully associative cache, a multi-way set-associative cache, or a cache with another type of mapping. The cache may include one large portion shared among all cores or may be divided into several separately functional slices (e.g., one slice for each core). Each cache may also include one portion shared among all cores and several other portions that are separate functional slices per core.

In many embodiments, CPU 602 includes a system memory controller 614 to provide an interface to communicate with system memory 616. System memory 616 may comprise dynamic random access memory (DRAM), such as a type of double data rate (DDR) DRAM, non-volatile memory such as flash memory, phase change memory (PCM), or another type of memory technology. System memory 616 may be a general purpose memory to store data and instructions to be operated upon by CPU 602. Additionally, there may be other potential devices within computer system 600 that have the capability to read and write to the system memories, such as a direct memory access (DMA)-capable I/O (input/output) device. The link (i.e., bus, interconnect, etc.) that couples CPU 602 with system memory 616 may include one or more optical, metal, or other wires (i.e. lines) that are capable of transporting data, address, control, and clock information.

CPU 602 also may include an integrated graphics subsystem 618, that is capable of computing pixel, vertex, and geometry data to be displayed on display device 620. CPU 602 additionally may include a communication subsystem 622 that provides an I/O interface to communicate with external devices. The communication subsystem 622 may include both wired 624 and wireless 626 interfaces. The wired interface 624 may be an Ethernet compatible interface, in some embodiments. The wireless interface 626 (through one or more antenna components for transmitting and receiving) may be compatible for wireless communications through several protocols. For example, the communication subsystem 622 wireless interface 626 may communicate through an IEEE 802.11-based protocol, a Bluetooth protocol, a cellular protocol, a WiMAX protocol, and/or one or more other wireless protocols.

CPU 602 also includes a storage controller 628 to provide an interface to a mass storage device 630. Mass storage device 630 may be a hard disk drive, a solid state drive, or another form of mass storage. Additionally, CPU 602 also is capable of communicating to I/O devices, such as I/O device 632 and I/O device 634 through I/O host controllers 636 and 638, respectively. The I/O host controllers each may allow the CPU 602 to communicate with one or more I/O devices through a certain protocol. For example, one I/O host controller may be a Universal Serial Bus (USB) host controller to allow for plug in communication through USB ports between the CPU 602 and other external USB interfaces. Finally, an input interface 640 allows the computer system to be coupled to input devices such as a keyboard 642 or mouse 644.

In many other embodiments that are not shown, the computing system that makes up computing device 100 (item 100 in FIG. 1) may be implemented in a different way, such as in a standard CPU/chipset configuration instead of as a SoC design.

In many embodiments, logic, including potentially web proxy logic and DNS cache logic, may be present in any one of the following locations. When at least a portion of the logic is implemented in software, the logic may be present in system memory 616 (logic 700), mass storage 630 (logic 702), cache 612 (logic 704), or potentially in any core (not shown). When at least a portion of the logic is implemented in hardware, the logic may be present in the general circuitry (uncore) of the CPU 602 outside of the cores (logic 706), in system memory controller 614 (logic 708), in the communication subsystem 622 (logic 710), or potentially in any core (not shown). Furthermore, as shown in FIGS. 4 and 5, some logic, again potentially including web proxy logic and DNS cache logic, may be located in a central server external to computer system 600.

Thus, embodiments of a device and system to reduce domain name system lookup latencies are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A non-transitory machine-readable medium having stored thereon instructions, which if executed by a machine causes the machine to perform a method comprising: storing one or more translated Internet Protocol (IP) addresses, wherein each translated IP address is associated with a specific Internet host name; performing a look up of each Internet host name in a local Domain Name System (DNS) cache; and providing a translated Internet Protocol (IP) address of a first Internet host name to a web browser in response to finding a first remote server host name in the DNS cache; and scanning a document, immediately upon the document beginning to be retrieved from the Internet, for one or more patterns, each pattern denoting an Internet host name; asynchronously causing an Internet DNS server to translate each Internet host name pattern discovered from the document scan to an associated IP address; and asynchronously storing each translated IP address in a local DNS cache in response to receiving a request from a web browser, retrieving a content item referenced in the document that resides on a first remote server, the first remote server including an associated first remote server host name.

2. The machine-readable medium of claim 1, wherein the method further comprises:
   querying the DNS cache for a translation of the first remote server host name.

3. The machine-readable medium of claim 1, wherein the method further comprises:
   storing a valid-until time associated with each translated IP address in the DNS cache.

4. The machine-readable medium of claim 3, wherein the method further comprises:
   upon expiry of the valid-until time of a given translated IP address, requesting a new translation of an Internet host name associated with the given translated IP address;
   receiving the re-translated IP address and a new valid-until time associated with the re-translated IP address; and re-storing the received re-translated IP address and the new valid-until time in the DNS cache.

5. The machine-readable medium of claim 4, wherein the method further comprises:
determining whether a first translated IP address with a first valid-until time has passed a popularity test; and
requesting a new translation of the first translated IP address upon expiry of the first valid-until time in response to the first IP address passing the popularity test.

6. The machine-readable medium of claim 5, wherein the popularity test further comprises surpassing a threshold number of accesses to the first translated IP address.

7. The machine-readable medium of claim 1, wherein the document begins to be retrieved in response to a user causing the document to load.

8. A method comprising: storing one or more translated Internet Protocol (IP) addresses, wherein each translated IP address is associated with a specific Internet host name; performing a look up of each Internet host name in a local Domain Name System (DNS) cache; and providing a translated Internet Protocol (IP) address of a first Internet host name to a web browser in response to finding a first remote server host name in the DNS cache; and scanning a document, immediately upon the document beginning to be retrieved from the Internet, for one or more patterns, each pattern denoting an Internet host name; asynchronously causing an Internet DNS server to translate each Internet host name pattern discovered from the document scan to an associated IP address; and asynchronously storing each translated IP address in a local DNS cache in response to receiving a request from a web browser, retrieving a content item referenced in the document that resides on a first remote server, the first remote server including an associated first remote server host name.

9. The method of claim 8, wherein the method further comprises:
querying the DNS cache for a translation of the first remote server host name.

10. The method of claim 8, wherein the method further comprises:
storing a valid-until time associated with each translated IP address in the DNS cache.

11. The method of claim 10, wherein the method further comprises:
upon expiry of the valid-until time of a given translated IP address, requesting a new translation of an Internet host name associated with the given translated IP address;
receiving the re-translated IP address and a new valid-until time associated with the re-translated IP address; and
re-storing the received re-translated IP address and the new valid-until time in the DNS cache.

12. The method of claim 11, wherein the method further comprises:
determining whether a first translated IP address with a first valid-until time has passed a popularity test; and
requesting a new translation of the first translated IP address upon expiry of the first valid-until time in response to the first IP address passing the popularity test.

13. The method of claim 12, wherein the popularity test further comprises surpassing a threshold number of accesses to the first translated IP address.

14. A device comprising: a Domain Name System (DNS) cache to store one or more translated Internet Protocol (IP) addresses, wherein each translated IP address is associated with a specific Internet host name; logic associated with the DNS cache, the DNS cache logic to: perform a look up of each Internet host name in the DNS cache; and provide a translated IP address of a first Internet host name to a web browser in response to finding a first remote server host name in the DNS cache; and web proxy logic to: scan a document, immediately upon the document beginning to be retrieved from the Internet, for one or more patterns, each pattern denoting an Internet host name; asynchronously cause an Internet DNS server to translate each Internet host name pattern discovered from the document scan to an associated IP address; asynchronously store each translated IP address in the DNS cache; and receive a request from a web browser to retrieve a content item referenced in the document that resides on a first remote server, the first remote server including an associated first remote server host name.

15. The device of claim 14, wherein the web proxy logic is further operable to:
query the DNS cache for a translation of the first remote server host name.

16. The device of claim 15, wherein the device further comprises: logic associated with the DNS cache, the DNS cache logic to: perform the look up of the first remote server host name in the DNS cache in response to the query.

17. The device of claim 16, wherein the DNS cache logic is further operable to:
store a valid-until time associated with each translated IP address in the DNS cache.

18. The device of claim 17, wherein the DNS cache logic is further operable to:
upon expiry of the valid-until time of a given translated IP address, request a new translation of an Internet host name associated with the given translated IP address;
receive the re-translated IP address and a new valid-until time associated with the re-translated IP address; and
re-store the received re-translated IP address and the new valid-until time in the DNS cache.

19. The device of claim 18, wherein the DNS cache logic is further operable to:
determine whether a first translated IP address with a first valid-until time has passed a popularity test; and
request a new translation of the first translated IP address upon expiry of the first valid-until time in response to the first IP address passing the popularity test.

20. The device of claim 19, wherein the popularity test further comprises surpassing a threshold number of accesses to the first translated IP address.

21. The device of claim 14, wherein the document begins to be retrieved in response to a user causing the document to load.

22. A system comprising: a central server including web proxy logic, the web proxy logic to: scan a document, immediately upon the document beginning to be retrieved from the Internet from a first remote server, for one or more patterns, each pattern denoting an Internet host name; asynchronously cause an Internet Domain Name System (DNS) server to translate each Internet host name pattern discovered from the document scan to an associated Internet Protocol (IP) address; asynchronously store each translated IP address in a DNS cache on a mobile device; receive a request from a web browser on the mobile device to retrieve a content item referenced in the document that resides on the first remote server, the first remote server including an associated first remote server host name; and query the mobile device for a translation of the first remote server host name; and a mobile computing device including: a DNS cache to store one or more translated IP addresses, wherein each translated IP address is associated with a specific Internet host name; and logic associated with the DNS cache, the DNS cache logic to: perform a look up of the first remote server host name in the DNS cache in response to the query; and provide a translated IP address of the first remote server host name to the web browser in response to finding the first remote server host name in the DNS cache.

23. The system of claim 22, wherein the DNS cache logic is further operable to:
store a valid-until time associated with each translated IP address in the DNS cache.

24. The system of claim 23, wherein the DNS cache logic is further operable to:
upon expiry of the valid-until time of a given translated IP address, request a new translation of an Internet host name associated with the given translated IP address;
receive the re-translated IP address and a new valid-until time associated with the re-translated IP address; and
re-store the received re-translated IP address and the new valid-until time in the DNS cache.

25. The system of claim 24, wherein the DNS cache logic is further operable to:
determine whether a first translated IP address with a first valid-until time has passed a popularity test; and
request a new translation of the first translated IP address upon expiry of the first valid-until time in response to the first IP address passing the popularity test.

\* \* \* \* \*